Nov. 27, 1923.

F. W. T. ZOEPKE
CUTTING MACHINE
Filed Feb. 16, 1922

INVENTOR.
F. W. T. Zoepke
BY
ATTORNEYS.

Nov. 27, 1923.
F. W. T. ZOEPKE
1,475,336
CUTTING MACHINE
Filed Feb. 16, 1922 5 Sheets-Sheet 2
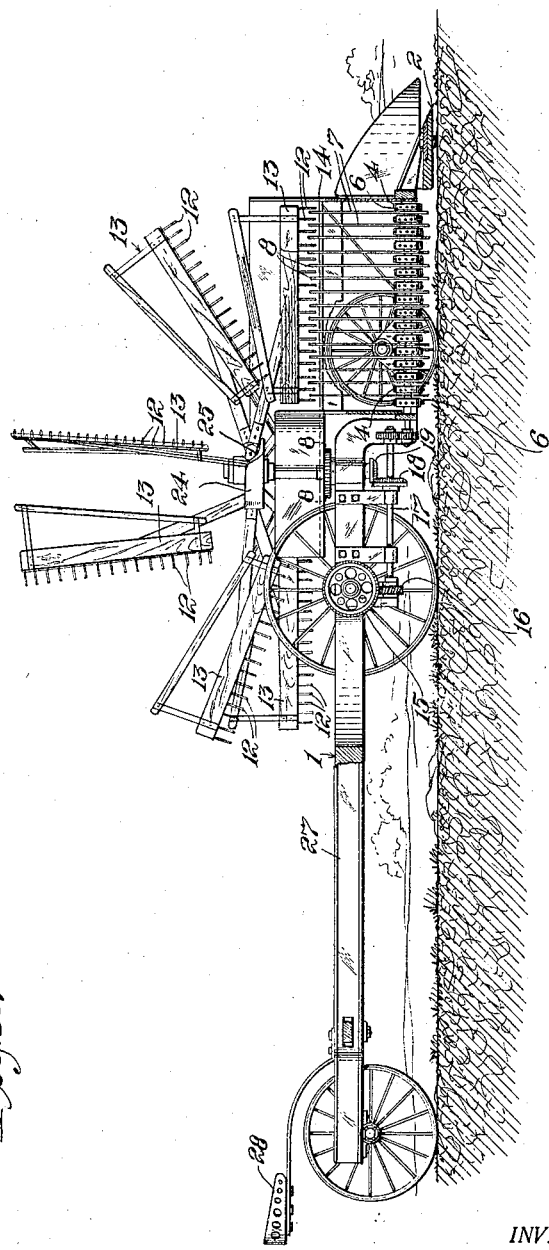
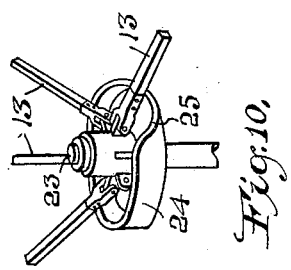
INVENTOR.
F.W.T. Zoepke
BY
ATTORNEYS.

Nov. 27, 1923.
F. W. T. ZOEPKE
1,475,336
CUTTING MACHINE
Filed Feb. 16, 1922     5 Sheets-Sheet 3
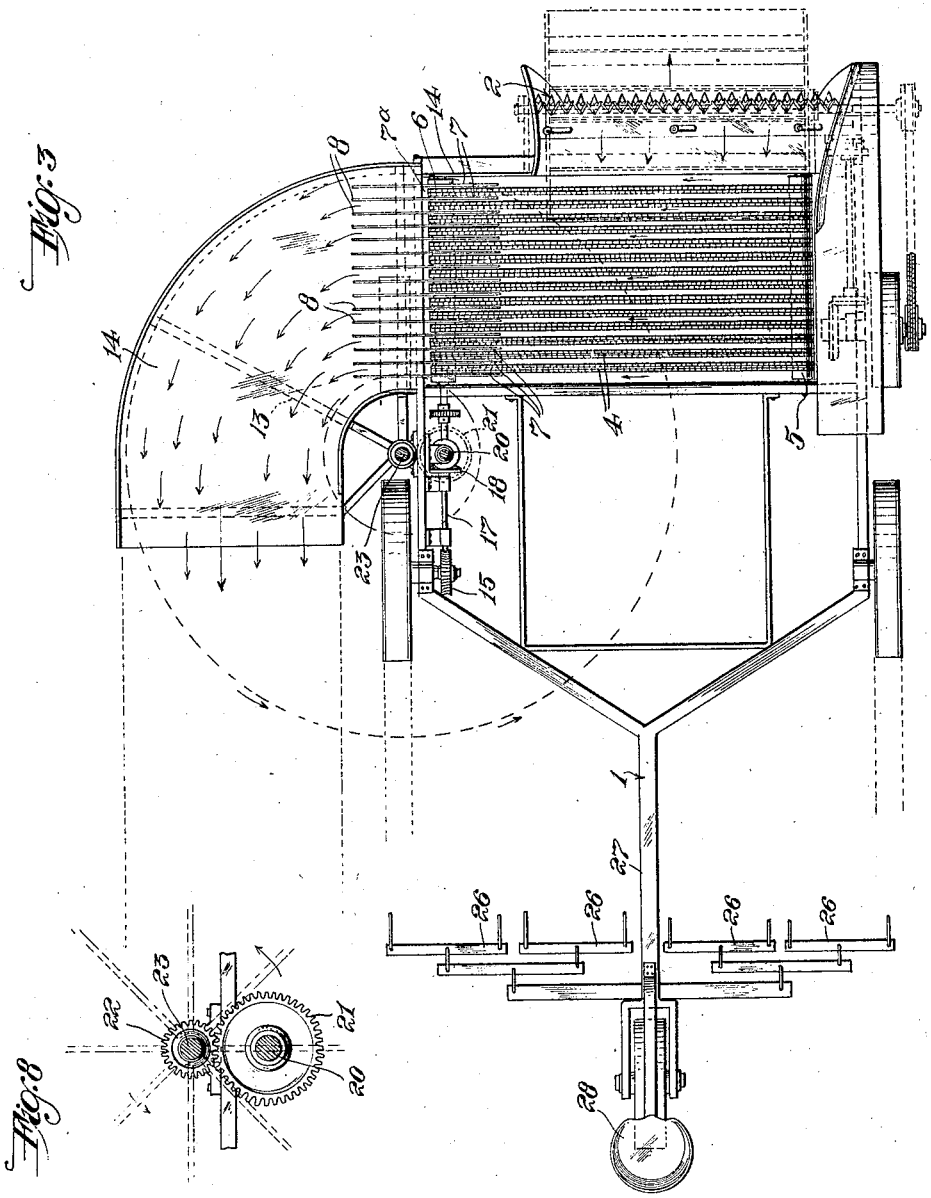
INVENTOR.
F.W.T. Zoepke
BY
his ATTORNEYS.

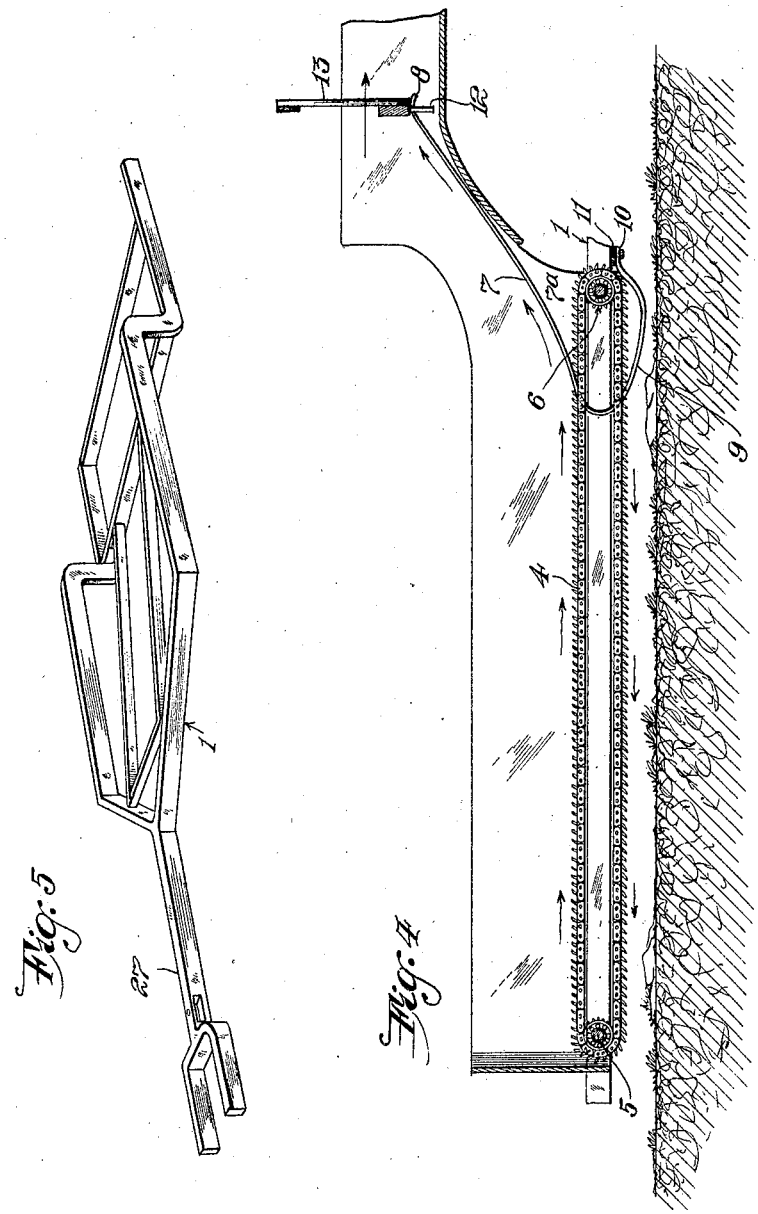

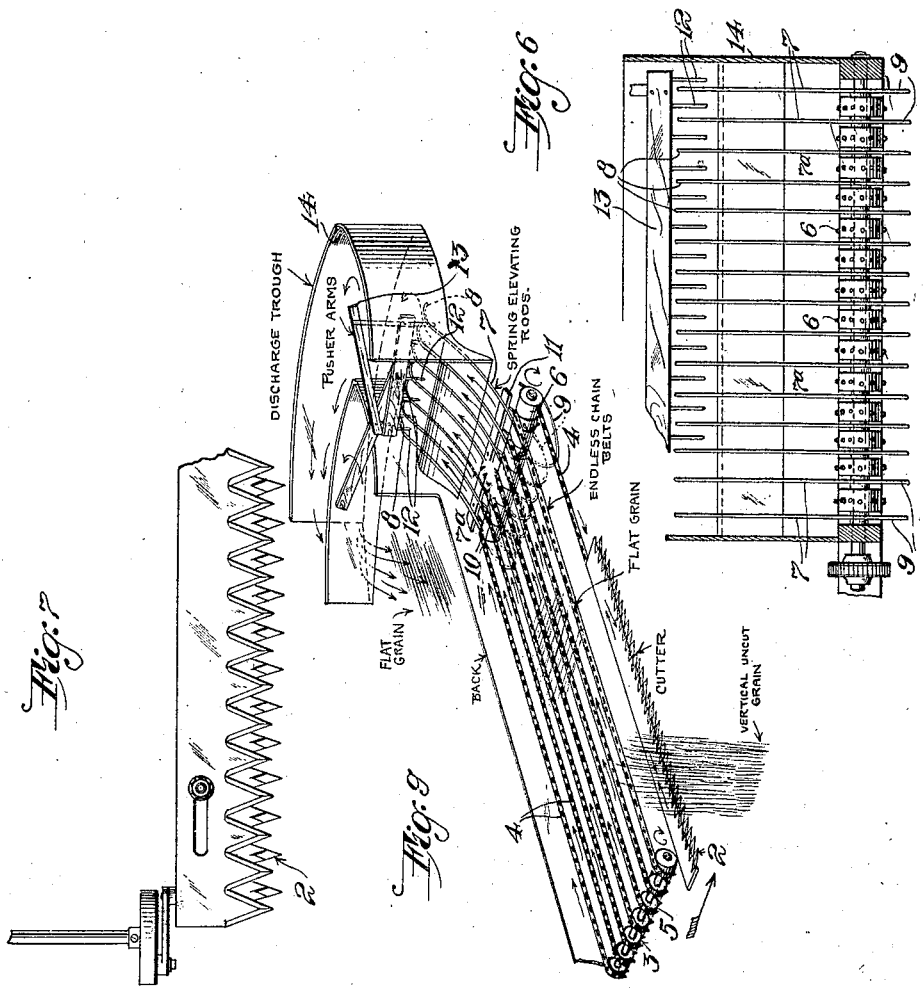

Patented Nov. 27, 1923.

1,475,336

UNITED STATES PATENT OFFICE.

FRED WM. T. ZOEPKE, OF GREAT FALLS, MONTANA.

CUTTING MACHINE.

Application filed February 16, 1922. Serial No. 536,994.

*To all whom it may concern:*

Be it known that I, FRED WILLIAM T. ZOEPKE, a citizen of the United States, residing at Great Falls, in the county of Cascade and State of Montana, have invented certain new and useful Improvements in Cutting Machines, of which the following is a specification, reference being had therein to the accompanying drawings.

This invention relates to a cutting machine, used particularly in the harvesting of grain.

The object of the invention is the construction of an efficient machine for cutting the grain and conveying the grain to one side of the machine, or either dropping the grain in a row on the ground or discharging the grain at the side of the machine into a suitable receiver, such as the intake end of a thrasher or harvesting machine.

With this and other objects in view, my invention comprises certain novel combinations, constructions and arrangements of parts as will be hereinafter described, illustrated in the accompanying drawings, and more particularly pointed out in the appended claims.

In the drawings:

Figure 2 is a longitudinal, sectional view taken through the machine.

Figure 3 is a top, plan view of the machine, partly in section, with the rotary paddle mechanism removed.

Figure 4 is a longitudinal, sectional view of the grain conveyor and the spring-elevating rods, and part of the discharge trough.

Figure 5 is a perspective of the frame of the machine.

Figure 6 is a fragmentary, sectional view of the machine, showing particularly the spring-elevating rods.

Figure 7 is a fragmentary, plan view of the knives or sickle bar.

Figure 8 is a detailed sectional view, taken on line 8—8, of Fig. 2.

Figure 9 is a diagram view, showing the manner of the grain passing through the machine.

Figure 1:
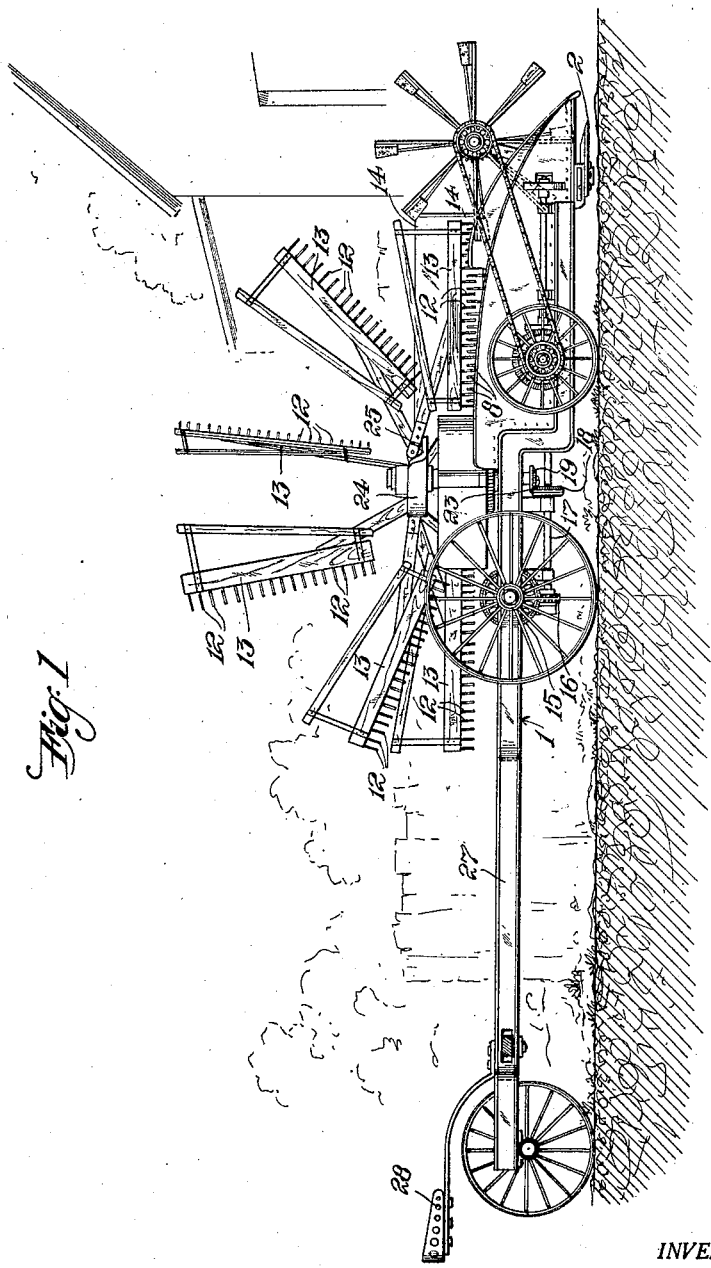
Figure 1 is a view, in side elevation, of a machine constructed in accordance with the present invention.

Figure 10 is an enlarged perspective, fragmentary view of the arms 13, shaft 23 and cam device 24.

Referring to the drawings by numerals, 1 designates the frame of the machine, which is provided on its front end with the usual knives or sickle bar 2. The grain conveyor 3 consists of a plurality of toothed endless chain belts 4, passing at the outer ends of the grain conveyor, over the single roller 5, but at the inner end of the conveyor these belts 4 pass over separate sprockets 6, Fig. 2. Between each two contiguous sprockets is positioned an elevating rod, and each elevating rod comprises a downwardly-curved body 7 having an inwardly-bent upper end 8, and the body 7 terminates in a large loop portion 9 that partly surrounds the shaft, carrying the sprocket 6, and the extreme outer end 10, of the loop 9, is fastened to a cross board 11. The grain cut by the knives 2 falls upon the grain conveyor 3 and is thence forced up the inclined way constituted by the bodies 7 of the rods 7ª, and as the pins 12 of the paddle arms 13 come in contact with the grain at the top of the rods, the grain will be pushed off the inwardly-extending end 8 of each rod, and thence conveyed around the curved, discharged trough 14, and from the discharge end of trough 14 the grain is either dropped onto the ground in a row or may be taken up to the inlet end of a thrasher, if a thrasher is connected to, or cooperating in conjunction with my cutting machine.

The rotary paddle mechanism is driven through the medium of the gear wheel 15, attached to the main axle, and this gear meshes with a worm 16, which worm is carried by shaft 17; fastened to shaft 17 is beveled gear 18, and this gear meshes with gear 19. Through the medium of gear 19, Figs. 1 and 2, shaft 20 is rotated, on which is secured the large gear 21; gear 21 meshes with gear 22 (Fig. 8) carried by the shaft 23, to which shaft 23 is pivotally attached the paddle arms 13. A cam device 24 causes the arms to be raised during a portion of the travel to clear the machine, but as the arms ride down the inclined way 25, each arm will ride into the position shown in Figs. 1, 2, 4 and 9 for taking the cut grain off the upper portion of the rods and conveying the grain around the length of the discharge trough 14 and thence forcing the grain out of the discharge end of the trough, as indicated by the words "Flat grain" in Fig. 9.

The draft animals are attached to the single trees 26, which single trees are suitably connected to the tongue portion 27 of the frame 1. A seat 28 is mounted upon the tongue portion 27 of the frame 1.

The rods 7ª, attached to the cross board 11, will yield somewhat when considerable cut grain is on the same, but owing to the greatly curved inclination of the body 7 of the rods, the grain will be allowed to crowd upon the rod and be "picked up" by the pins 12 on the paddle arms of the rotary paddle mechanism, while the machine is in operation. It will be understood that the cutting of the grain, the operation of the grain conveyor, as well as the rotary paddle mechanism is all in unison.

My cutting mechanism is comparatively simple, and can be well understood from the foregoing description, and is efficient in operation.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims:

What I claim is:

1. In a cutting machine of the class described, the combination with a frame, of cutting means carried by said frame, a grain conveyor including a plurality of sprockets at one end and endless chain belts on said sprockets, a discharge trough contiguous to said sprockets, rods supported at one end upon said frame and positioned between said sprockets and extending into said trough, and means for removing cut grain or straw or the like from the ends of said rods extending into the trough and conveying said cut grain the length of the trough.

2. In a cutting machine of the class described, the combination with a frame, cutting means carried by said frame, of a grain conveyor comprising endless belts positioned behind the cutting means and mounted upon the frame, a discharge trough at one end of said grain conveyor, devices positioned between the endless belts and extending into the trough for receiving grain, and means for removing grain from the said devices and causing the grain to travel the length of the trough.

3. In a cutting machine of the class described, the combination with a frame, cutting means carried by said frame, of a conveyor behind the cutting means and adapted to receive the grain, a receiving trough at one end of the conveyor, yieldable elevating means between the conveyor and the trough, and means for removing grain from the elevating means and conveying it the length of the trough.

4. In a cutting machine of the class described, the combination with a frame, of cutting means carried by said frame, a conveyor behind said cutting means, a receiving trough contiguous to one end of said conveyor, an elevating device open at its upper end, and a rotary paddle mechanism including paddle arms having pins and the pins adapted to enter the open end of the elevating device and remove grain off same and convey the grain the length of the trough.

5. In a cutting machine of the class described, the combination with a frame, of cutting means carried by said frame, a grain conveyor carried by said frame and positioned behind the cutting means, a cross board fastened to the frame, spring rods fastened to said cross board and extending up through the grain conveyor, a discharge trough under said rods, and means adapted to travel in the trough for removing grain off the rods and longitudinally of the axis of the trough.

6. In a cutting machine of the class described, the combination with a frame, of cutting means carried by said frame, a grain conveyor on said frame behind the cutting means, a discharge trough carried by the frame contiguous to one end of the grain conveyor, a cross board on the frame contiguous to the grain conveyor, spring elevating rods extending through the grain conveyor, each rod including an inwardly-curved body having its upper end extending into the trough, the lower end of the body terminating in a loop portion, the loop portion extending partly around one end of the grain conveyor and having its outer end fastened to the cross board, and means for removing grain off the upper end of the rods and conveying the grain to the discharge end of the trough.

7. In a cutting machine of the class described, the combination with a frame, of cutting means carried by said frame, a grain conveyor behind the cutting means, a curved trough supported by the frame contiguous to one end of the grain conveyor, means for conveying grain from the grain conveyor to the trough, a rotary paddle mechanism including paddle arms carried by the frame, and each paddle arm adapted to move into the trough contiguous to the elevating means at the end of the grain conveyor and move or push the grain around the trough to its discharge end.

8. In a cutting machine of the class described, the combination with a frame, of a curved, discharge trough supported upon said frame, a rotary paddle mechanism including a plurality of pivoted arms carried by said frame, each arm adapted to move into said curved, discharge trough and travel the length thereof, cutting means carried by said frame, and means for conveying cut grain from the cutting means into the trough in the path of movement of each arm as it travels the length of the trough.

9. In a cutting machine of the class described, the combination with a frame, of cutting means carried by said frame, a belt grain conveyor behind the cutting means and supported by the frame, a discharge trough at one end of said grain conveyor, an elevating spring-rod device positioned partly around one end of the conveyor and extending into the discharge trough, and a rotary paddle mechanism co-operating with the conveyor and the trough for moving grain off the spring-rod device and lengthwise of the trough.

In testimony whereof I hereunto affix my signature.

FRED WM. T. ZOEPKE.